Aug. 3, 1954
A. V. HANDREN, JR., ET AL
2,685,330
CLIP FOR SUPPORTING THE U-SHAPED
ENDS OF SINUOUS SPRING STRIPS
Filed Sept. 5, 1950
2 Sheets-Sheet 1
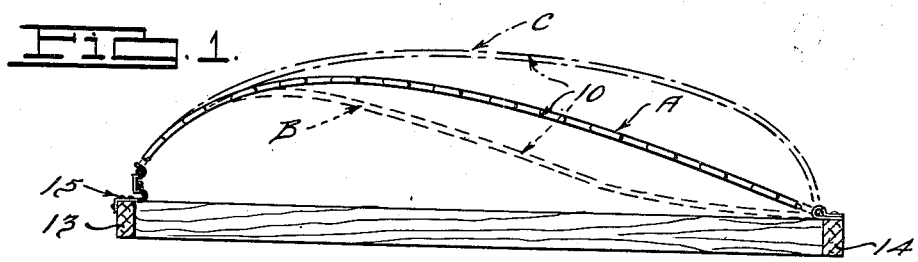
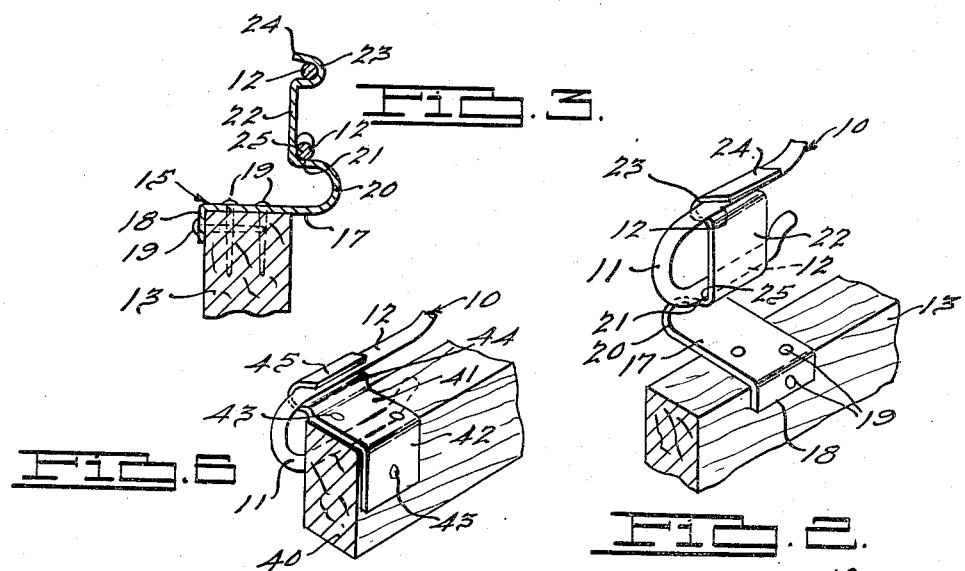
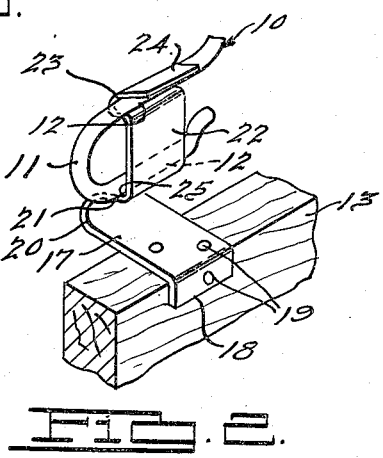
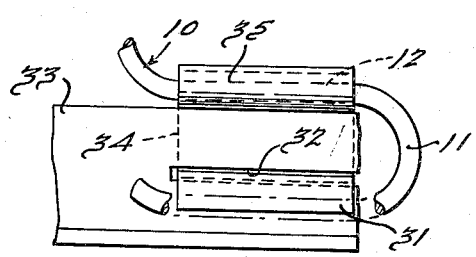
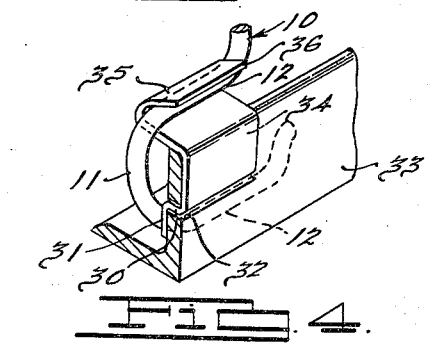
INVENTORS.
Arthur V. Handren, Jr.
Harold A. Vogel.
BY
Harness, Dickey & Pierce
ATTORNEYS.

Aug. 3, 1954

A. V. HANDREN, JR., ET AL
CLIP FOR SUPPORTING THE U-SHAPED
ENDS OF SINUOUS SPRING STRIPS 2,685,330

Filed Sept. 5, 1950

INVENTORS.
Arthur V. Handren, Jr.
Harold A. Vogel.
BY

Harness, Dickey & Pierce
ATTORNEYS.

UNITED STATES PATENT OFFICE 2,685,330

CLIP FOR SUPPORTING THE U-SHAPED ENDS OF SINUOUS SPRING STRIPS

Arthur V. Handren, Jr., Birmingham, and Harold A. Vogel, Detroit, Mich., assignors to No-Sag Spring Company, Warren Township, Mich., a corporation of Michigan Application September 5, 1950, Serial No. 183,157

5 Claims. (Cl. 155—179)

This invention relates to spring supporting clips, and more particularly to a supporting clip attachable to a frame element, and designed to fulcrum a spring strip in a manner to support the spring strip under tension in a high arc relative to the frame element.

The various forms of supporting clips forming the subject matter of this invention are especially designed for use in connection with a sinuous type of spring strip, as for instance, a spring made of wire bent back and forth to provide open opposite loops usually connected by straight portions.

The supporting clips of the present invention are adapted for attachment to the frame of a seat, couch, davenport or the like and are designed to fulcrum the end of the spring strip above or spaced from the plane of the frame to produce a high arc in the spring strip adjacent the fulcrum point thereof.

An important object of this invention is to produce spring supporting clips of the character described which may be readily attached to the seat frame to project beyond the plane thereof and to which the end of a spring strip may be quickly and easily secured in such a manner as to stress the spring strip so that a predetermined desirable contour is obtained when the spring is loaded or unloaded.

Another object of this invention is to provide a spring supporting clip which is transversely rigid but capable of flexing longitudinally to permit the attached spring end to adjust itself to loaded conditions.

Other objects of the invention are to provide a clip which will support the end of the spring strip a predetermined distance from the plane of the frame element and at the same time prevent lateral tilting movement thereof; to provide a fulcrum for the spring in predetermined spaced relation to the frame, and to provide a spring supporting clip which is simple in construction and economical of manufacture.

The various objects, advantages, and novel details of construction of the invention will be made more apparent as this description proceeds, especially when considered in connection with the accompanying drawing, wherein:

Figure 1 is a sectional view of a frame having a spring strip mounted thereon by a clip of the present invention;

Fig. 2 is a perspective view of a clip for supporting a spring strip embodying features of this invention;

Fig. 3 is a vertical sectional view of a frame and clip of the type shown in Fig. 2;

Fig. 4 is a perspective view of another form of clip adapted for attachment to an angle iron frame;

Fig. 5 is a side elevational view of the form of construction shown in Fig. 4;

Fig. 6 is a perspective view of still another form of supporting clip;

Figure 7:
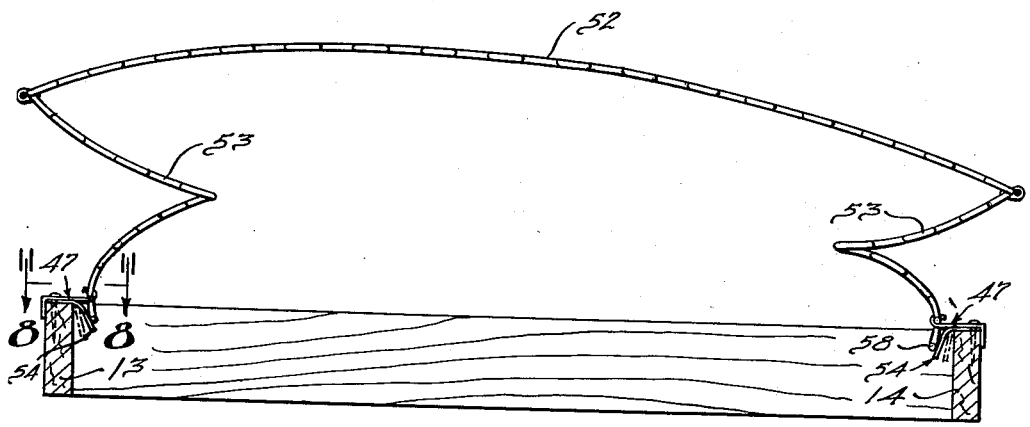
Fig. 7 is a sectional view of frame, showing a further form of resilient supporting clip.

In the drawing the reference character 10 indicates a spring of the general type for which the supporting clips of this invention are particularly designed. These springs are made of wire bent back and forth to produce oppositely disposed adjacent loops 11 joined by straight portions 12 and are formed on an arc of small radius so that when the ends are extended and secured to a frame, resistance is provided against downward deflection. These springs, when mounted, assume a uniform arcuate shape across the frame so the desirable contour is obtained either when the seat is occupied or unoccupied. With the clips of the present invention, which may be used at one or both ends of the spring, the spring strip is supported and stressed so that the desired contour is obtained both when the spring is loaded and unloaded.

In Fig. 1, the spring strip 10 is illustrated as being secured to front and rear frame elements 13 and 14 respectively; at the forward end by a clip 15 constructed in accordance with this invention, as shown in Figs. 2 and 3 and at the rearward end by a known clip.

The clip 15, illustrated more clearly in Figs. 2 and 3, is made from strip metal and is shaped to provide a main web or base portion 17 terminating on one edge in an angularly directed or downwardly extending flange 18 adapted to engage a face of the frame element 13 to locate and properly position the clip on the frame element. Both the base portion 17 and the flange 18 may be apertured to receive fastening elements 19 for securing the clip in place.

Connected to the web or base portion 17, opposite to the flange 18, is a return-bent or U-shaped portion 20, terminating in a straight or flat area 21. The portion 20 is capable of bending slightly under pressure to provide longitudinal flexibility or resiliency to the clip.

Extending substantially perpendicularly from the area 21, the clip is formed with a spacing web or leg 22 which terminates at its free end in a second return-bent or U-shaped spring receiving portion 23. The free end 24 of this U-shaped portion is inclined to produce a flare to facilitate the entrance of a straight portion 12 of the spring strip.

In attaching the spring strip to the clip the straight portion 12 thereof next adjacent the terminal straight portion is engaged in the second U-shaped portion 23 and the terminal straight portion rests on the shoulder formed by the flat area 21 and in the recess 25 formed by the juncture of the flat area 21 and the leg 22. The end of the spring strip is thus fulcrumed in the second U-shaped portion 23 and pivotal movement beyond a fixed point is prevented by engagement of the terminal straight portion in the recess 25. This nonpivotal support for the end of the spring strip places the same under tension and stresses the strip so that a predetermined desirable contour is obtained both in the loaded and unloaded conditions of the spring.

By anchoring the spring end above the plane of the frame by clips produced in accordance with this invention a high arc in the spring strip is obtained. If the spring strip is attached at its forward end by one of the clips of this invention and at its rearward end by a standard clip, permitting pivotal movement, the spring, when unloaded, will assume substantially the contour illustrated by full lines A in Fig. 1. Under load the spring will assume substantially the contour illustrated by dotted lines B. If the high arc nonpivotal clips of this invention are employed at both ends of the spring, the spring, when unloaded, will assume substantially the contour illustrated by dot and dash lines C.

The engagement of the terminal portions of the spring strip with the U-shaped portion 23, area 21 and recess 25 of the clip not only provides a nonpivotal anchorage for the spring which resists deflection of the same but affords sufficient contact between the spring and clip to prevent lateral tilting of the spring strip. The longitudinal resiliency provided by the U-shaped portion 20 permits the attached spring end to adjust itself within limits to loaded conditions.

In Figs. 4 and 5 a supporting clip of this type is illustrated for use with angle iron frames. In this form of construction the clip is formed with a main web or base portion 30 terminating at one edge in an angularly directed or downwardly extending flange 31. The base portion 30 extends through a slot 32 in the angle iron frame member 33 and the flange 31 engages the face of the frame member to locate and properly position the clip thereon.

Extending substantially perpendicularly from the base portion 30 is a spacing web or leg 34 which terminates at its free end in a return-bent or U-shaped spring receiving portion 35. The free end 36 of this U-shaped portion is inclined to produce a flair to facilitate the entrance of a straight portion 12 of the spring strip. In attaching the spring strip to the clip the straight portion 12 thereof next adjacent to the terminal straight portion is engaged and fulcrumed in the U-shaped spring-receiving portion 35 and the terminal straight portion rests against the flange 31 providing a nonpivotal connection which resists deflection of the spring strip adjacent the point of attachment.

In Fig. 6 another form of construction is illustrated adapted for attachment to a wooden frame element 40. In this form the clip is formed with a main web or base portion 41 terminating at one edge in an angularly directed or downwardly extending flange 42 adapted to engage a face of the frame element to locate and position the clip on the frame. Both the base portion 41 and the flange 42 may be apertured to receive fastening elements 43 for securing the clip in place.

Extending substantially perpendicularly from the base portion 41 is a spacing web or leg 44 which terminates at its free end in a return-bent or U-shaped spring-receiving portion 45. In attaching the spring strip to the clip, a straight portion of the spring is fulcrumed in the U-shaped portion 45, and the terminal straight portion of the spring engages the face of the frame element 40 providing a nonpivotal connection which tensions the spring strip and resists deflection thereof adjacent to the point of attachment.

Figure 8:
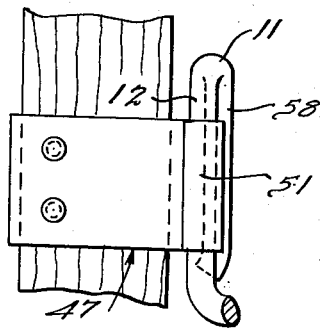
Fig. 8 is an enlarged broken plan view of the clip illustrated in Fig. 7.
Figure 9:
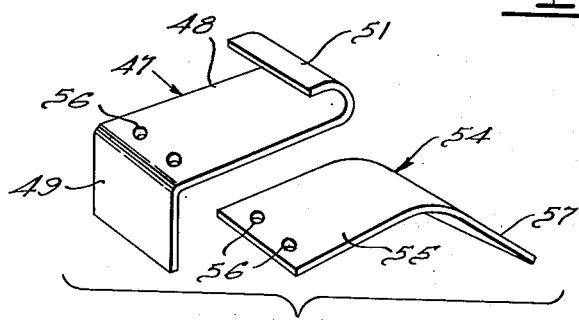
Fig. 9 is an exploded view of the clip illustrated in Figs. 7 and 8.

Referring to Figs. 7, 8 and 9, a further form of resilient strip is illustrated that wherein a separate spring element is employed with a nonresilient clip portion. The clip portion 47 has a web 48 which rests upon the top of the frame elements 13 and 14 from one end of which a flange 49 extends downwardly at right angles, parallel to the outer face of the frame members. The opposite end of the web 48 is reversely bent into a hook 51 to receive a straight portion 12 of a spring strip 52. The spring strip 52 is made of wire bent back and forth to provide the loops 11 joined by straight portion 12, the strip being bent at the ends into V-shape supporting portions 53.

A spring element 54 of the same or similar width as the clip portion 47 has a flat portion 55 which is disposed beneath the web portion 48 of the clip portion, the element and portion having mating apertures 56 therethrough which nails are driven into the frame elements for retaining the element and clip portion thereon in aligned relation to each other.

The protruding web 57 of the element 54 is deflected downwardly at an angle to the flat portion 55 of the element 54. This forms a ledge against which the endmost straight portion 58 of the spring 52 abuts when the next adjacent straight portion 12 is secured within the hook 51 of the clip portion 47. This arrangement permits the straight portion 12 to pivot within the hook 51 as the end portion 58 deflects the web 57 of the spring element 54. This deflection increases with load and provides additional resiliency to the spring elements 52 which becomes more effective with increased loads.

It will be apparent that in all the forms of construction described, the spring end is fulcrumed above the plane of the frame elements, and a nonpivotal mounting is provided which places the spring under tension and stresses the spring strip so that a predetermined desired contour is obtained. Also in each case the fulcrum point of the spring strip is governed by the length of the spacing web or leg which may be varied to suit existing conditions.

What is claimed is:

1. A clip for securing a spring strip in position on a frame element, comprising a base portion terminating at one edge in an angularly extending flange adapted to engage a face of the frame element to locate and position the clip, a reversely bent portion, a spacing web extending substantially perpendicularly to said reversely bent portion above said frame element, said web terminating in a spring-receiving hook portion for fulcruming the spring strip above its end, said web engaging the terminal portion of the spring strip below the hook to provide a non-pivotal connection which resists deflection of the spring strip adjacent its point of attachment, with the end portion of the strip disposed substantially in a vertical plane.

2. A supporting clip for attaching a spring strip composed of alternate loops joined by straight portions to a frame element, comprising a base portion for attachment to the frame element, a curved spring portion on one end of the base portion, a web connected to said spring portion and extending above the frame element substantially perpendicularly to the base portion, a notched portion on the upper end of said web for receiving a straight portion of the spring strip adjacent its end portion with the web engaging the end portion of the spring strip below said straight portion to provide a non-pivotal connection which resists deflection of the spring strip adjacent its point of attachment while permitting said web to deflect.

3. A supporting clip for attaching a spring strip to a frame element, comprising a base portion for attachment to the frame element, a spacing web extending substantially perpendicularly to said base portion above said element, a resilient connection between said base portion and said spacing web, a spring-receiving hook carried by said web at its upper end for fulcruming the spring strip at a point spaced from its end, and means engaging the end of the spring strip beyond the hook to provide a non-pivotal connection which resists deflection of the spring strip adjacent its point of attachment while maintaining the end of the spring strip in substantially a vertical plane.

4. A supporting clip for attaching a spring strip to a frame element, comprising a base portion for attachment to the frame element, a spacing web extending substantially perpendicularly to said base portion above said element, a substantially U-shaped portion connecting said base portion and said spacing web, a spring-receiving hook carried by the upper end of said web for fulcruming the spring strip at a point spaced from its end, and means engaging the terminal portion of the spring strip below the hook to provide a non-pivotal connection which resists deflection of the spring strip the end of which is supported in a substantially vertical plane.

5. A supporting clip for attaching a spring strip to a frame element, comprising a base portion for attachment to the frame element, a spacing web extending substantially perpendicularly to said base portion above said element, a substantially U-shaped portion connecting said base portion and spacing web and forming a recess at the juncture of said U-shaped portion and spacing web, a spring-receiving hook carried by said web for fulcruming the spring strip at a point spaced from its end, the end of the spring strip below the fulcrum engaging said said recess to provide a non-pivotal connection which resists deflections of the spring strip while supporting the end portion thereof in a substantially vertical plane.

References Cited in the file of this patent

UNITED STATES PATENTS

| Number | Name | Date |
| --- | --- | --- |
| 1,936,720 | Kronheim | Nov. 28, 1933 |
| 2,214,136 | Hopkes | Sept. 10, 1940 |
| 2,217,290 | Nordmark | Oct. 8, 1940 |
| 2,251,049 | Haberstump | July 29, 1941 |
| 2,257,633 | Bank | Sept. 30, 1941 |
| 2,341,419 | Bank | Feb. 8, 1944 |
| 2,542,458 | Bank | Feb. 20, 1951 |
| 2,652,885 | Engel | Sept. 22, 1953 |

FOREIGN PATENTS

| Number | Country | Date |
| --- | --- | --- |
| 146,491 | Switzerland | July 1, 1931 |